Figure 1:
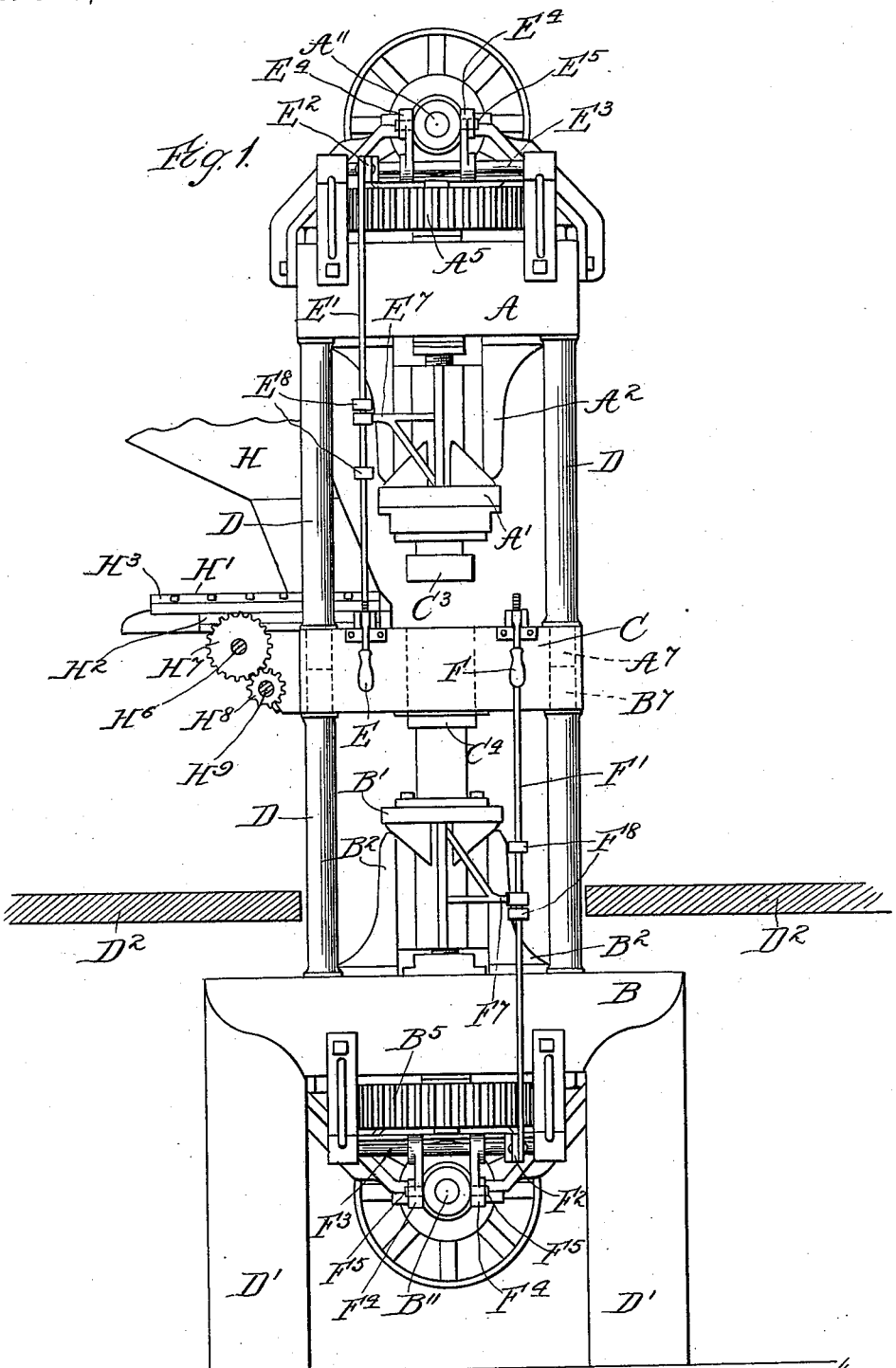

(No Model.)

W. J. SOPER.
BRICK MACHINE.

No. 545,543.

4 Sheets—Sheet 1.

Patented Sept. 3, 1895.

Witnesses:
Wm. F. Henning
Donald M. Carter

Inventor:
Walter J. Soper
By James W. Parker, Atty.

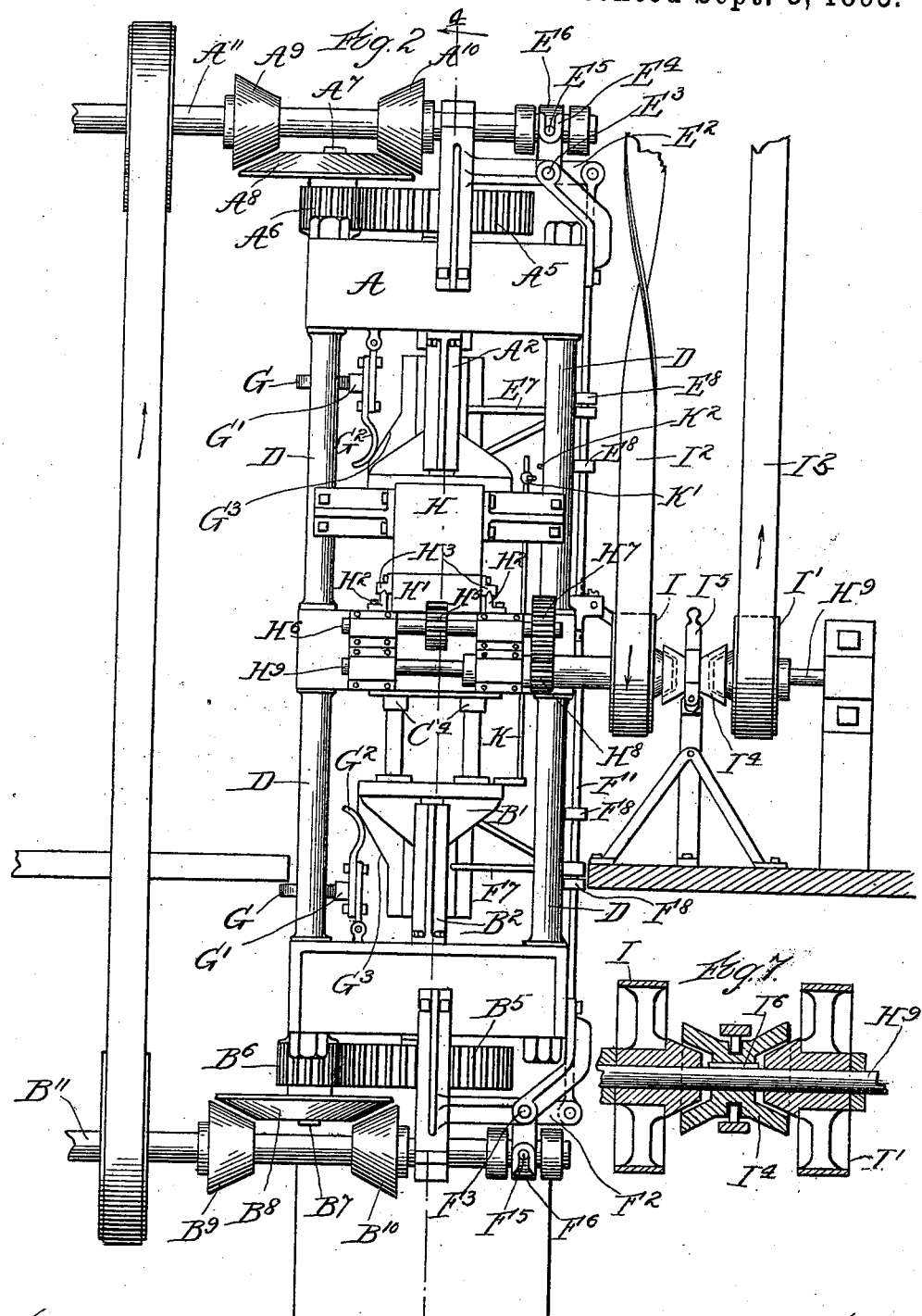

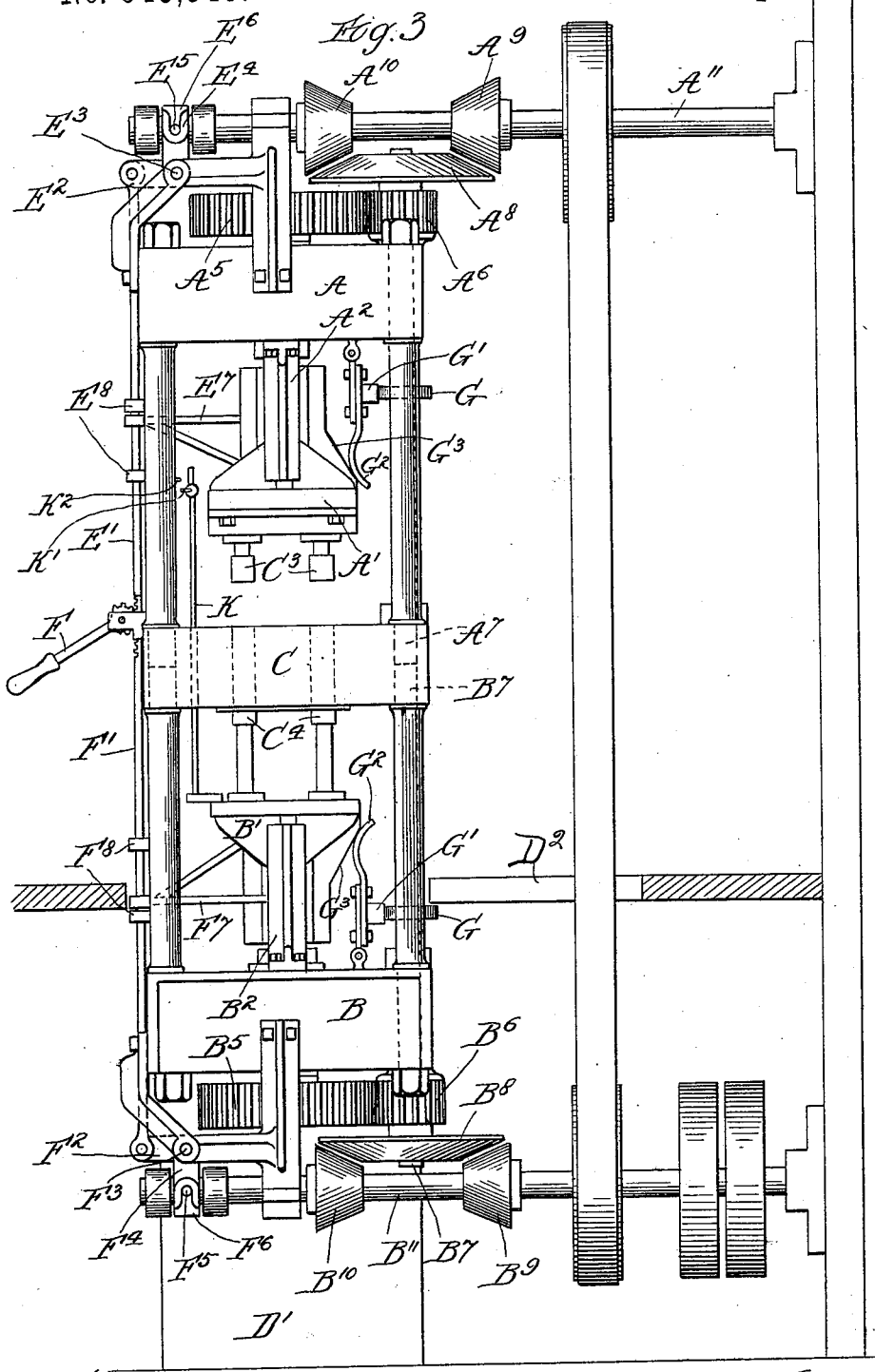

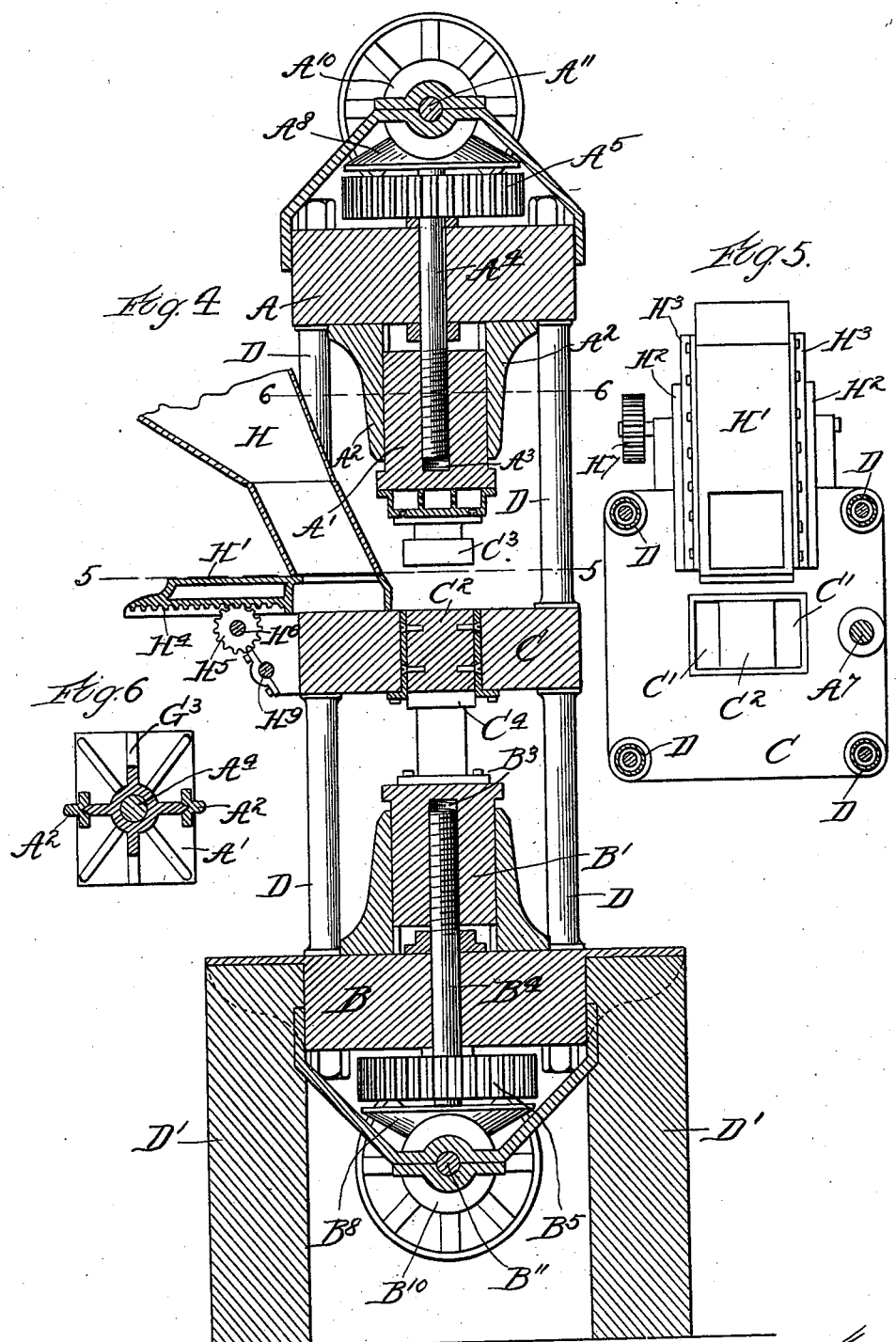

UNITED STATES PATENT OFFICE.

WALTER J. SOPER, OF CHICAGO, ILLINOIS, ASSIGNOR TO THE CHICAGO HYDRAULIC-PRESS BRICK COMPANY, OF SAME PLACE.

BRICK-MACHINE.

SPECIFICATION forming part of Letters Patent No. 545,543, dated September 3, 1895.

Application filed July 26, 1894. Serial No. 518,626. (No model.)

*To all whom it may concern:*

Be it known that I, WALTER J. SOPER, a citizen of the United States, residing at Chicago, in the county of Cook and State of Illinois, have invented a certain new and useful Improvement in Brick-Machines, of which the following is a specification.

My invention relates to brick-machines; and it has for its object to provide a new and improved brick-machine for making bricks of all designs and thicknesses, of which the following is a description, reference being had to the accompanying drawings, wherein—

Figure 1 is a side elevation with parts omitted. Fig. 2 is a front elevation. Fig. 3 is a rear elevation with parts omitted. Fig. 4 is a longitudinal section on line 4 4, Fig. 2. Fig. 5 is a cross-section on line 5 5, Fig. 4. Fig. 6 is a cross-section on line 6 6, Fig. 4. Fig. 7 is a section through the reversing friction-clutch for charger.

Like letters refer to like parts throughout the several figures.

As shown in the drawings, the frame of the machine is composed of the top plate A, bottom plate B, and central plate or table C, connected together by the supports D D. The plate B rests upon suitable supports D' D' beneath the floor $D^2$. The cross-heads A' B' move up and down between the guides $A^2 A^2$ and $B^2 B^2$ attached to the upper and lower plates A B. These cross-heads are provided with the threaded holes $A^3 B^3$, Fig. 4, in which work the threaded ends of the shafts $A^4 B^4$. Said shafts are provided at their outer ends with the gears $A^5 B^5$, which mesh with the pinion $A^6 B^6$ on the shafts $A^7 B^7$. On the ends of said shafts are the disks $A^8 B^8$, adapted to engage the cone friction pulleys $A^9 A^{10} B^9 B^{10}$ on the shafts $A^{11} B^{11}$. Said disks are preferably made of iron and the cone-pulleys of paper or the like. The shaft $A^{11}$ is movable in the direction of its length, so that either can be brought into engagement with the disk. The same is true of shaft $B^{11}$. The longitudinal motion of said shafts is controlled by the levers E F connected to the rods E' F'. Said rods are connected to the arms $E^2 F^2$ on the rocker-shafts $E^3 F^3$. The arms $E^4 E^4$ and $F^4 F^4$ on said rocker-shafts engage the pins $E^5 F^5$, projecting from the loose sleeves $E^6 F^6$ on the shafts $A^{11} B^{11}$. Said loose sleeves work in between the collars $E^7 E^7$ and $F^7 F^7$ rigid with said shafts. The levers E F may be connected in any convenient manner to the rods E' F'. As shown in the drawings, they are connected by means of racks and pinions. The rods E' F' pass loosely through holes in the ends of the arms $E^7 F^7$ projecting from the cross-heads A' B', so that said arms slide along the rods as the cross-heads move up and down. $E^8 E^8$ and $F^8 F^8$ are stops between which said arms move, said stops being so situated that they are engaged by said arms and the rods E' F' moved at the limits of the movement of each cross-head, so as to reverse the motion. The shafts $A^7 B^7$ are each provided with a brake-wheel G, against which bear the brake-shoes G' G', which are attached to the spring-arms $G^2 G^2$ pivoted to the top and bottom plates A B. Said spring-arms are adapted to engage the beveled parts $G^3$ on the cross-heads A' B'. By this arrangement, when the cross-head A' reaches the upward limit of its motion and moves the rod E' by means of arm $E^7$ and stop $E^8$, so as to move the friction-pulley $A^9$ out of engagement with the disk $A^8$ the brake-shoe is automatically set so as to stop the shaft $A^7$, and hence arm $E^7$, before the shaft $A^{11}$ has been moved far enough to bring the friction-pulley $A^{10}$ in engagement with the disk $A^8$, and the machine is stopped. The cross-head B' is stopped in a similar manner at the downward limit of its motion. The table C is provided with the holes or openings C' C', Fig. 5, which act as molds for the brick and which are separated by the removable piece $C^2$.

$C^3 C^3$ and $C^4 C^4$ are dies attached to the upper and lower cross-heads A' B' and adapted to work in the holes or openings C' C'. When the openings are filled with clay the upper and lower dies are moved toward each other and the clay pressed into a brick between them, the shape of the brick depending upon the shape of the dies and can be changed at will. The charger that delivers the clay as it is to be used is composed of the hopper H fastened to the sliding frame H', which moves along the V-shaped guides $H^2 H^2$, attached to the table C. (See Fig. 2.)

$H^3 H^3$ are angle-irons attached to the frame H' and provided with V-shaped grooves, into which the guides $H^2$ $H^2$ fit. It will be noticed that the V-shaped guides are about half-way up the side of the frame $H'$. This construction prevents any dirt that may fall over the sides of the hopper from getting on the guides. The platform $H'$ and hopper H are moved forward and backward along the guides $H^2$ by means of the rack $H^4$, Fig. 4, which engages the pinion $H^5$ on the shaft $H^6$, Fig. 2. On the end of said shaft is the gear $H^7$, which meshes with the pinion $H^8$ on the shaft $H^9$. Said latter shaft is provided with two loose pulleys I I', which are rotated in opposite directions by belts $I^2$ $I^3$ while the machine is in operation. A clutch $I^4$ is associated with the pulleys I I', so that the shaft $H^9$ may be brought to rest or rotated in opposite direction by moving the handle $I^5$. Any convenient clutch may be used in connection with pulleys I I'. As shown in the drawings, Fig. 7, the clutch $I^4$ consists of a sleeve rotating with the shaft, but adapted to slide along the spline $I^6$. At each end there is a conical-shaped opening, into which fit the conical-shaped ends of the pulleys.

The thickness of the bricks may be gaged by means of suitable adjustable pointers or the like attached to the cross-heads A' B', and the stops $E^8$ $F^8$ are adjusted so that the cross-heads are reversed at the required points.

As shown in the drawings, a rod $k$ is fastened to the lower cross-head B', and is provided at its upper end with the adjustable pointer K'. A stationary index or pointer $K^2$ is attached to the support D, so that the lower dies can be stopped at any desired point. The point at which the upper dies are stopped is determined by the position of the lower stop $E^8$. By moving the cross-heads A' B' by the screws $A^4$ $B^4$ the required pressure can be easily obtained.

It is evident that some or all of these several parts may be varied in form, construction, and arrangement, and that some of them may be omitted without departing from the spirit of my invention, and I therefore do not wish to be limited to the exact construction shown.

The use and operation of my invention are as follows: Suppose that when the parts are in the position shown in the drawings the molds or openings C' C' are filled with clay. The lever E is then moved so as to bring the revolving friction-cone $A^{10}$ in contact with the disk $A^8$. The motion of said cone is then communicated to said disk, pinion $A^6$, gear $A^5$, screw-shaft $A^4$, cross-head A, and dies $C^3$ $C^3$, moving said dies downward into the openings C' C'. Before the dies have reached the limit of their downward motion they are stopped by moving the lever E until neither of the friction cone pulleys $A^9$ and $A^{10}$ are in engagement with the disk $A^2$. The lever F is now moved until the friction-cone $B^9$ is brought into engagement with the disk $B^8$. When this occurs the cross-head B' and dies $C^4$ $C^4$ are moved upwardly. As soon as the adjustable pointer K' comes opposite the stationary pointer $K^2$ said lower dies are stopped, the upper dies are again set in motion, and their downward movement continues until the clay has been pressed between them and the lower dies $C^4$ $C^4$ into a brick of the required size. The arm $E^7$ now comes in contact with the lower stop $E^8$ and moves the shaft $A^{11}$ until the disk $A^8$ is freed from its engagement with the friction-cone $A^{10}$ and brought into engagement with the cone $A^9$. When this occurs the motion of the disk will be reversed and the cross-head and dies will be moved upwardly until the arm $E^7$ comes in contact with the upper stop $E^8$, when the shaft $A^{11}$ will be moved so that the friction-cone $A^9$ will be disengaged from the disk $A^8$. At this time the spring $G^{12}$ will have moved along the beveled surface $G^3$ on the cross-head A' and the brake-shoe G' will be forcibly pressed against the brake-wheel G, and hence, as soon as the driving power is removed by the disengagement of the cone $A^9$ and the disk $A^8$ and before the shaft $A^{11}$ has moved far enough to bring the cone $A^{10}$ in contact with the said disk, the mechanism will be brought to rest. The cross-head B and dies $C^4$ $C^4$ are again set in motion, carrying the completed bricks with them. As soon as the bricks are forced entirely out of the holes C' C' the arm $F^7$ comes in contact with the upper stop $F^8$ and the motion of the cross-head and dies is reversed. Said cross-head is stopped by the brake when it reaches its normal position in the same manner as the cross-head A'. The lever $I^5$ is then moved so as to bring the clutch $I^4$ into engagement with the revolving pulley I. The motion of said pulley is then communicated by the shaft $H^9$, pinion $H^8$, gear $H^7$, shaft $H^6$, pinion $H^5$, and rack $H^4$ to the hopper H, containing the clay from which the bricks are made, and said hopper is moved until it pushes the formed bricks to one side and is in communication with the openings C' C', so as to charge them with clay. The lever $I^5$ is then moved so that the clutch $I^4$ engages the pulley I' and the hopper is brought back to its normal position and the operation as above described again repeated. The dies can be quickly and easily removed and replaced by dies of any desired shape, and hence bricks of any required design or size can be made. It is necessary to move both the lower and upper dies in order to make the bricks of the same appearance and smoothness on the top and bottom.

This machine is made strong and durable, and at the same time can be quickly and easily modified so as to make a brick of any desired shape and size.

I claim—

1. The combination, in a brick making machine, of a table containing openings into which the clay is placed, a cross head above and below said table carrying dies adapted to fit into said openings, means by which said cross heads are moved toward said table and automatically brought back to their normal position, and an automatic brake adapted to be operated by being brought into engagement with the cross-head that stops said cross heads in said latter position.

2. The combination, in a brick machine, of a plate or table provided with openings into which the clay is placed, a cross head carrying dies adapted to fit into said openings, means of moving said cross head comprising a screw shaft working in a threaded hole in said cross head and operatively connected to a shaft provided with a friction disk, a brake wheel attached to said latter shaft and adapted to make contact with a brake shoe, a spring connected to said brake shoe and adapted to engage a beveled surface on the cross head to operate the brake, two friction cone pulleys adapted to alternately engage said disk and revolve it in opposite directions and means of moving said cone pulleys, substantially as described.

3. The combination with a brick machine having reciprocating crossheads, of a brake comprising a brake-shoe adapted to bear against a brake-wheel connected with a moving part of the machine, and a spring arm connected to said brake-shoe and adapted to engage a beveled surface on one of said crossheads whereby said brake is set at a predetermined point, substantially as described.

4. The combination in a brick machine of a top and bottom plate and an intermediate plate all rigidly connected together, openings in said intermediate plate in which the clay is placed, a cross-head above and below said intermediate plate, each carrying dies adapted to fit into said openings, means for moving said cross-heads comprising screw shafts working in threaded holes in said cross heads and having bearings in said top and bottom plate, said screw shafts being operatively connected to shafts associated with said top and bottom plates and provided each with a friction disk, two friction cone pulleys associated with each of said disks, each group attached to a longitudinally movable shaft, a rod or the like connected to each of said latter shafts and adapted to move it so that said cone pulleys may alternately be brought into engagement with their respective disks, stops attached to said rods, and arms attached to said cross-heads adapted to engage said stops at a predetermined point, substantially as described.

WALTER J. SOPER.

Witnesses:
DONALD M. CARTER,
JEAN ELLIOTT.